United States Patent
Lermant

(10) Patent No.: US 10,154,068 B2
(45) Date of Patent: Dec. 11, 2018

(54) SELF-ADJUSTING TIERED CACHING SYSTEM TO OPTIMIZE TRAFFIC PERFORMANCE AND ORIGIN OFFLOAD

(71) Applicant: Akamai Technologies, Inc., Cambridge, MA (US)

(72) Inventor: Pierre Lermant, Santa Clara, CA (US)

(73) Assignee: Akamai Technologies, Inc., Cambridge, MA (US)

( * ) Notice: Subject to any disclaimer, the term of this patent is extended or adjusted under 35 U.S.C. 154(b) by 261 days.

(21) Appl. No.: 14/981,997

(22) Filed: Dec. 29, 2015

(65) Prior Publication Data

US 2016/0191393 A1 Jun. 30, 2016

Related U.S. Application Data

(60) Provisional application No. 62/097,630, filed on Dec. 30, 2014.

(51) Int. Cl.
| | |
|---|---|
| *G06F 15/173* | (2006.01) |
| *H04L 29/06* | (2006.01) |
| *H04L 12/841* | (2013.01) |
| *H04L 12/835* | (2013.01) |
| *H04L 29/08* | (2006.01) |

(52) U.S. Cl.
CPC ............ *H04L 65/104* (2013.01); *H04L 47/28* (2013.01); *H04L 47/30* (2013.01); *H04L 67/2842* (2013.01)

(58) Field of Classification Search
CPC ........... G06F 12/0875; G06F 17/30132; G06F 17/30902; H04L 65/104; H04L 67/2842
See application file for complete search history.

(56) References Cited

U.S. PATENT DOCUMENTS

| | | | |
|---|---|---|---|
| 7,111,057 B1 | 9/2006 | Sherman et al. | |
| 7,376,716 B2 | 5/2008 | Dilley et al. | |
| 7,472,178 B2 | 12/2008 | Lisiecki et al. | |
| 8,180,720 B1 * | 5/2012 | Kovacs | H04L 67/2842 706/47 |
| 8,447,837 B2 | 5/2013 | Devanneaux et al. | |
| 8,891,522 B2 | 11/2014 | Fletcher et al. | |
| 9,158,845 B1 * | 10/2015 | Reddy | G06F 17/30864 |
| 9,680,952 B2 * | 6/2017 | Kovacs | H04L 67/2842 |
| 9,742,858 B2 * | 8/2017 | Holland | H04L 67/2804 |
| 2004/0093419 A1 | 5/2004 | Wiehl et al. | |
| 2007/0192444 A1 * | 8/2007 | Ackaouy | G06F 17/30902 709/219 |
| 2009/0055468 A1 * | 2/2009 | Burckart | G06F 17/30 709/203 |
| 2009/0282159 A1 * | 11/2009 | Wang | H04L 61/609 709/231 |

(Continued)

OTHER PUBLICATIONS

Nottingham et al, "HTTP Cache-Control Extensions for Stale Content," Internet Request for Comment (RFC) 5861, May 2010.

*Primary Examiner* — Shean Tokuta
(74) *Attorney, Agent, or Firm* — David H. Judson

(57) ABSTRACT

A tiered caching system (e.g., in an overlay network such as CDN) wherein SWR at an edge server therein is automatically set (preferably based on request rate), while SWR at a parent server therein has its SWR set at or near 0. Collectively, these SWR settings provide for a self-adjusting tiered caching system that optimizes both end user performance and the origin traffic offload.

16 Claims, 3 Drawing Sheets

(56) References Cited

U.S. PATENT DOCUMENTS

2014/0095804 A1* 4/2014 Lientz .................... H04L 67/06
                                                      711/144
2014/0207912 A1* 7/2014 Thibeault ............ H04L 65/4084
                                                      709/219

* cited by examiner

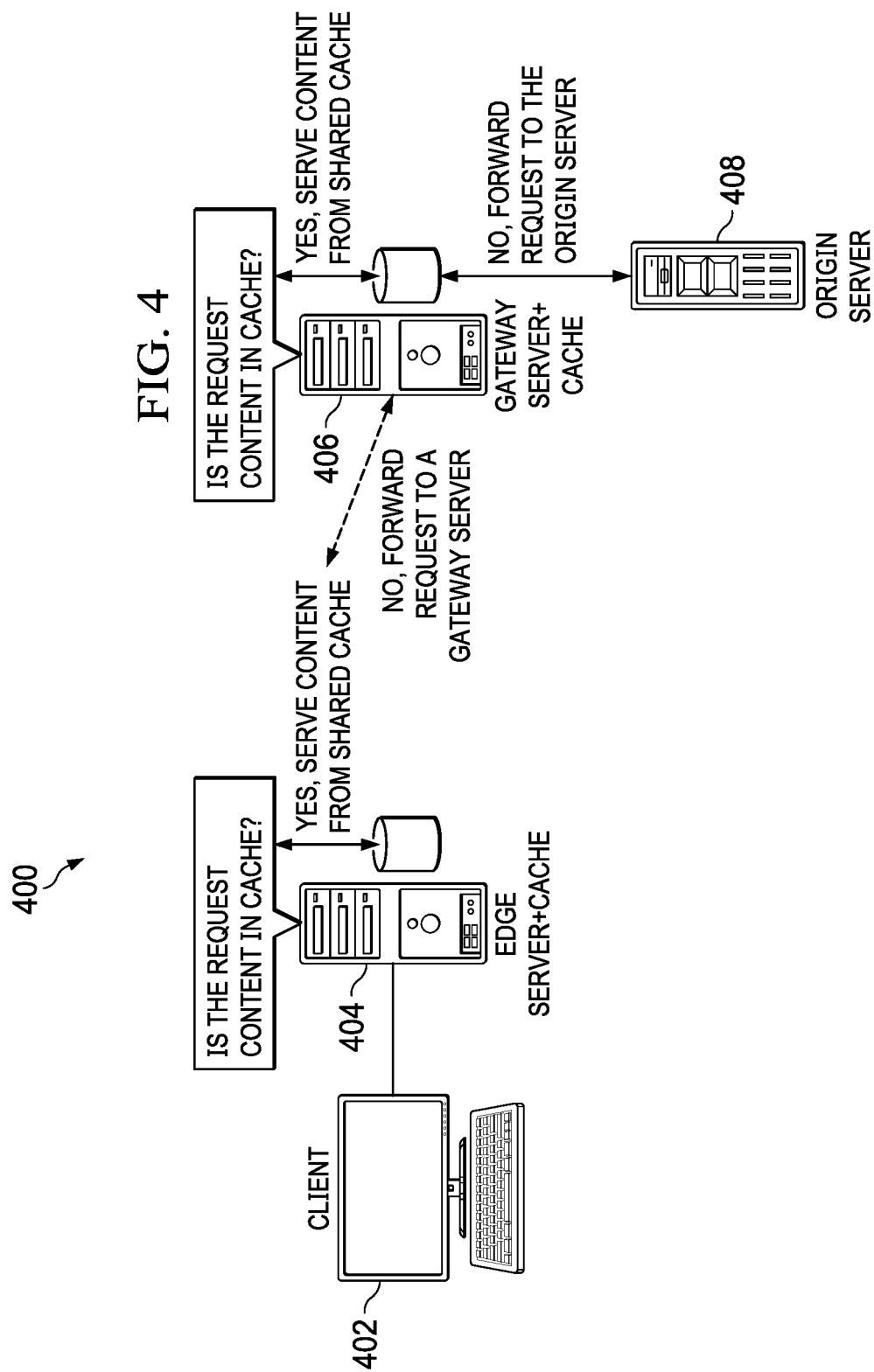

US 10,154,068 B2

SELF-ADJUSTING TIERED CACHING SYSTEM TO OPTIMIZE TRAFFIC PERFORMANCE AND ORIGIN OFFLOAD

BACKGROUND

Technical Field

This application relates generally to overlay networking and, in particular, to techniques to optimize traffic performance and origin offload by an overlay network, such as a content delivery network.

Brief Description of the Related Art

Distributed computer systems are well-known in the prior art. One such distributed computer system is a "content delivery network" or "CDN" that is operated and managed by a service provider. The service provider typically provides the content delivery service on behalf of third parties (customers) who use the service provider's infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network. A digital property typically is bound to one or more edge configurations that allow the service provider to account for traffic and bill its customer.

To maximize end user experience, content delivery networks often implement some form of the Stale-While-Revalidate ("SWR") HTTP Cache-Control extension. The SWR extension is described in Internet Request for Comment (RFC) 5861, titled "HTTP stale controls." The functionality allows a cache to immediately return a stale response while it revalidates it in the background, thereby hiding latency (both in the network and on the server) from clients.

BRIEF SUMMARY

The approach herein provides a tiered caching system (e.g., in an overlay network such as CDN) wherein SWR at an edge server therein is automatically set (preferably based on request rates), while SWR at a parent server therein has its SWR set at or near 0. Collectively, these SWR settings provide for a self-adjusting tiered caching system that optimizes both end user performance and the origin traffic offload.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject disclosure and the advantages thereof, reference is now made to the following descriptions taken in conjunction with the accompanying drawings, in which:

FIG. 4 depicts a self-adjusting tiered caching system to optimize traffic performance and origin offload according to this disclosure.

DETAILED DESCRIPTION

Figure 1:
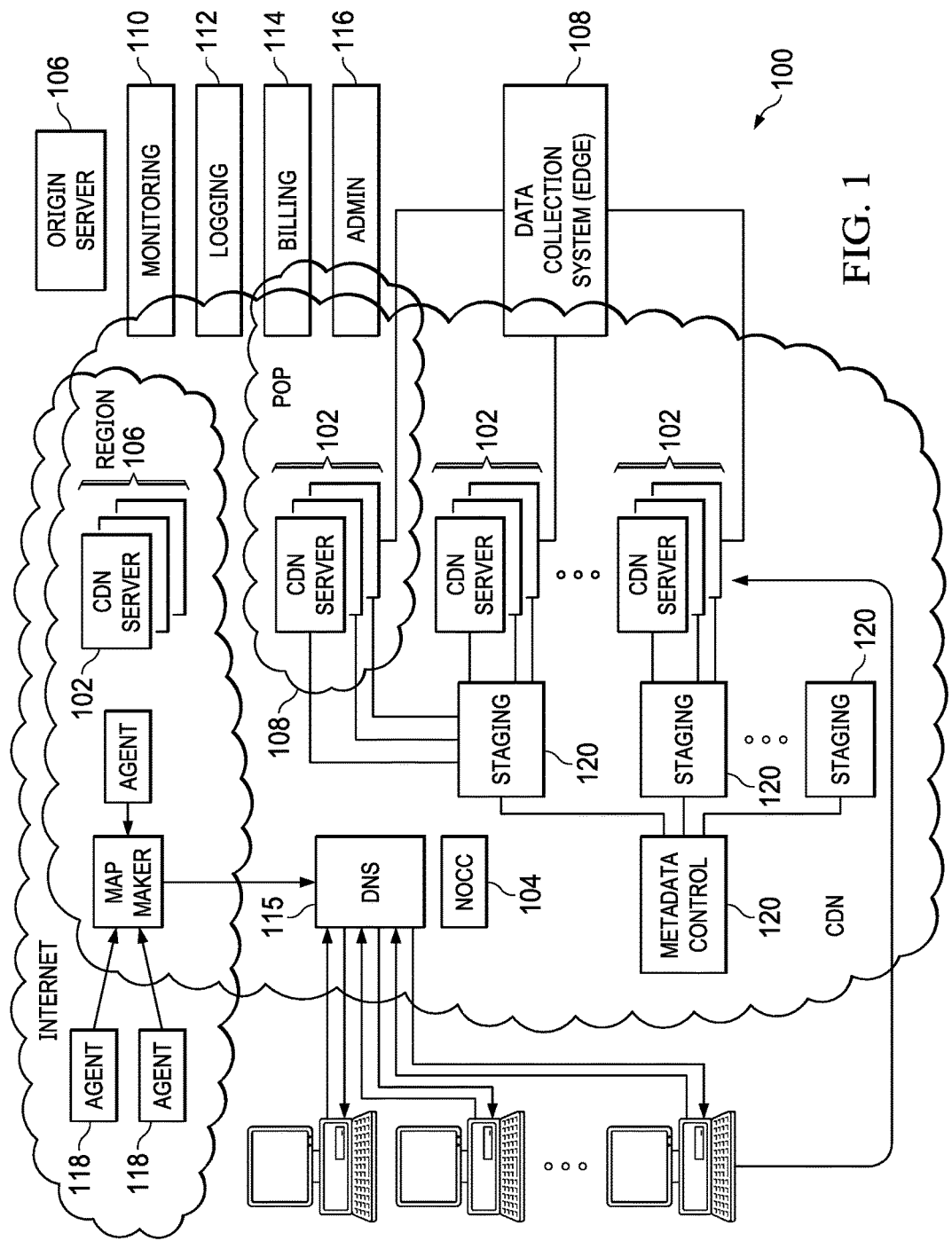
FIG. 1 is a block diagram illustrating a known distributed computer system configured as a content delivery network (CDN)

FIG. 1 illustrates a known distributed computer system configured as a content delivery network (CDN). The system has a set of machines 102a-n distributed around the Internet. Typically, most of the machines are servers located near the edge of the Internet, i.e., at or adjacent end user access networks. A network operations command center (NOCC) 104 manages operations of the various machines in the system. Third party sites, such as web site 106, offload delivery of content (e.g., HTML, embedded page objects, streaming media, software downloads, and the like) to the distributed computer system 100 and, in particular, to "edge" servers. Typically, content providers offload their content delivery by aliasing (e.g., by a DNS CNAME) given content provider domains or sub-domains to domains that are managed by the service provider's authoritative domain name service. End users that desire the content are directed to the distributed computer system to obtain that content more reliably and efficiently. Although not shown in detail, the distributed computer system may also include other infrastructure, such as a distributed data collection system 108 that collects usage and other data from the edge servers, aggregates that data across a region or set of regions, and passes that data to other back-end systems 110, 112, 114 and 116 to facilitate monitoring, logging, alerts, billing, management and other operational and administrative functions. Distributed network agents 118 monitor the network as well as the server loads and provide network, traffic and load data to a DNS query handling mechanism 115, which is authoritative for content domains being managed by the CDN. A distributed data transport mechanism 120 may be used to distribute control information (e.g., metadata to manage content, to facilitate load balancing, and the like) to the edge servers.

Figure 2:
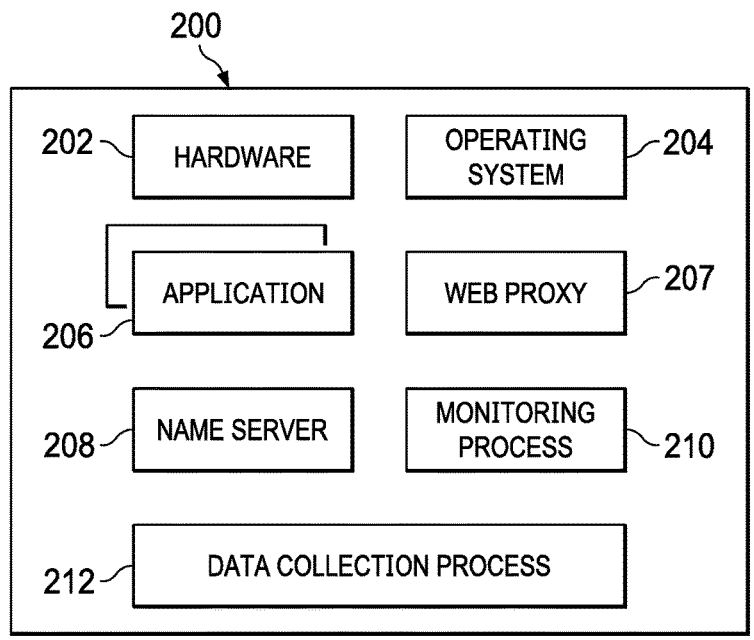
FIG. 2 is a representative CDN edge machine configuration.

As illustrated in FIG. 2, a given machine 200 comprises commodity hardware (e.g., an Intel Pentium processor) 202 running an operating system kernel (such as Linux or variant) 204 that supports one or more applications 206a-n. To facilitate content delivery services, for example, given machines typically run a set of applications, such as an HTTP proxy 207 (sometimes referred to as a "global host" or "ghost" process), a name server 208, a local monitoring process 210, a distributed data collection process 212, and the like. For streaming media, the machine typically includes one or more media servers, such as a Windows Media Server (WMS) or Flash server, as required by the supported media formats.

A CDN edge server is configured to provide one or more extended content delivery features, preferably on a domain-specific, customer-specific basis, preferably using configuration files that are distributed to the edge servers using a configuration system. A given configuration file preferably is XML-based and includes a set of content handling rules and directives that facilitate one or more advanced content handling features. The configuration file may be delivered to the CDN edge server via the data transport mechanism. U.S. Pat. No. 7,111,057 illustrates a useful infrastructure for delivering and managing edge server content control information, and this and other edge server control information can be provisioned by the CDN service provider itself, or (via an extranet or the like) the content provider customer who operates the origin server.

The CDN may include a storage subsystem, such as described in U.S. Pat. No. 7,472,178, the disclosure of which is incorporated herein by reference.

The CDN may operate a server cache hierarchy to provide intermediate caching of customer content; one such cache hierarchy subsystem is described in U.S. Pat. No. 7,376,716, the disclosure of which is incorporated herein by reference.

The CDN may provide various technologies and techniques to accelerate traffic flow between an edge server, on the one hand, and a customer origin server, on the other. These technologies provide acceleration for many different types of interactions, e.g., delivery of dynamic content, edge server interactions with back-end origin infrastructures, and the like. Representative examples include, without limitation, the techniques described in U.S. Pat. No. 8,194,438 (overlay path selection optimization), and U.S. Pat. No. 8,477,837 (content pre-fetching). Other IP, TCP, UDP or application-layer optimizations may be implemented as well to facilitate such acceleration.

The CDN may provide secure content delivery among a client browser, edge server and customer origin server in the manner described in U.S. Publication No. 20040093419. Secure content delivery as described therein enforces SSL-based links between the client and the edge server process, on the one hand, and between the edge server process and an origin server process, on the other hand. This enables an SSL-protected web page and/or components thereof to be delivered via the edge server.

As an overlay, the CDN resources may be used to facilitate wide area network (WAN) acceleration services between enterprise data centers (which may be privately-managed) and third party software-as-a-service (SaaS) providers.

In a typical operation, a content provider identifies a content provider domain or sub-domain that it desires to have served by the CDN. The CDN service provider associates (e.g., via a canonical name, or CNAME) the content provider domain with an edge network (CDN) hostname, and the CDN provider then provides that edge network hostname to the content provider. When a DNS query to the content provider domain or sub-domain is received at the content provider's domain name servers, those servers respond by returning the edge network hostname. The edge network hostname points to the CDN, and that edge network hostname is then resolved through the CDN name service. To that end, the CDN name service returns one or more IP addresses. The requesting client browser then makes a content request (e.g., via HTTP or HTTPS) to an edge server associated with the IP address. The request includes a host header that includes the original content provider domain or sub-domain. Upon receipt of the request with the host header, the edge server checks its configuration file to determine whether the content domain or sub-domain requested is actually being handled by the CDN. If so, the edge server applies its content handling rules and directives for that domain or sub-domain as specified in the configuration. These content handling rules and directives may be located within an XML-based "metadata" configuration file.

The SWR Cache-Control Extension

By way of additional background, to maximize their end user experience, a CDN may implement some form of the Stale-While-Revalidate (SWR) HTTP Cache-Control extension. As noted above, this extension allows a cache to immediately return a stale response while it revalidates it in the background, thereby hiding latency (both in the network and on the server) from clients.

Because CDNs want to strictly honor the TTL (time-to-live) of a website resource, they typically trigger this process when a request arrives at the edge server within a certain percentage of the overall TTL. For instance, if the TTL is one minute and the SWR is set to 10%, then a request hitting an edge server 0 to 6 seconds (10% of one minute) before the TTL expires triggers an asynchronous revalidation call to the origin server, while the request is served from the server's cache.

Figure 3:
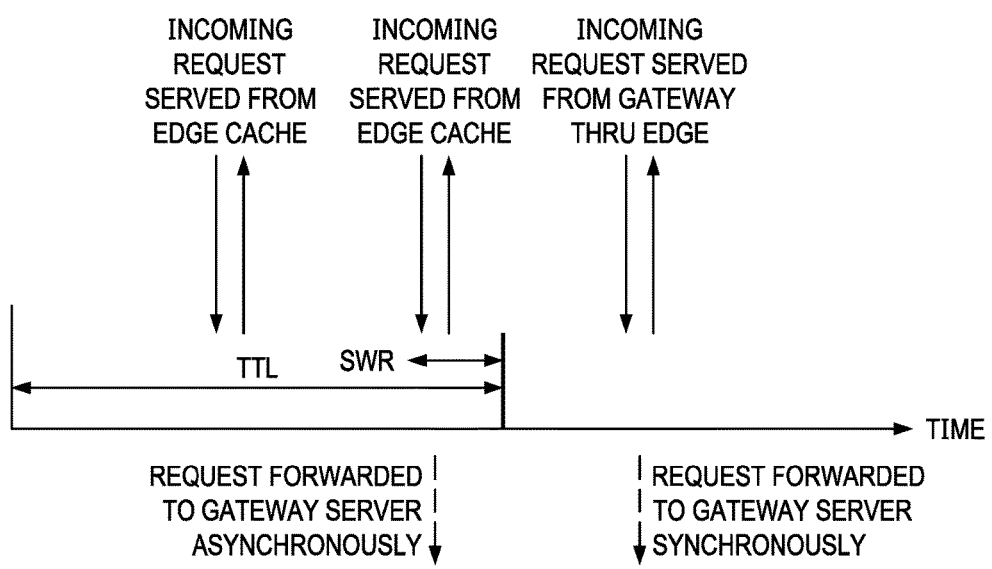
FIG. 3 depicts a Stale-While-Revalidate (SWR) process depicting that a request hitting an edge server during an SWR period immediately returns a stale response while the server revalidates it asynchronously in the background, thereby hiding latency (both in the network and on the server) from clients.

FIG. 3 illustrates this known SWR process in the context of an edge cache (e.g., one of the edge servers in FIG. 2). While use of the SWR process increases overall performance (because the end user does not have to wait for this revalidation to happen), it also lowers off-load to the origin infrastructure, by reducing the actual TTL. In the example above, and for a busy edge machine that gets requests every second, the actual TTL would be around 54 or 55 sec, which lowers the offload (compared to no SWR process) by about 10%.

Thus, there is a tension between, on the one hand, enhancing end user experience (through faster resource download from cache) and, on the other hand, origin traffic offload. This raises the question of how to optimally set the SWR value?

The approach herein describes a system that automatically sets the SWR to optimize both the performance and the origin traffic offload.

Self-Adjusting Tiered Caching System to Optimize Traffic Performance and Origin Offload As will be seen, the technique of this disclosure takes advantage of two factors: (1) the ability of an edge server to compute a rate of incoming requests for a given resource; and (2) the ability of a CDN to leverage a tiered caching architecture, such as depicted in FIG. 4 (see, also U.S. Pat. No. 7,376,716, referenced above). As depicted in FIG. 4, an overlay network 400 (such as a CDN comprises a tiered caching system comprising edge server and cache 404 positioned close to a requesting client machine 402, together with a gateway server and cache 406 (the cache parent) positioned close to the CDN customer's origin server 408. Typically, each of the CDN machines 404 and 406 is configured as shown in FIG. 2, and an end user machine 402 is a desktop, laptop, mobile device, set-top box, Smart television, Internet appliance, IoT device, or the like.

In a tiered architecture of this type, the edge server 404 typically is located very close (e.g., within a few milliseconds of IP packet roundtrip time) to the client 402, and the cache parent (the gateway server 406) may or may not be close to the origin server 408. With this type of cache hierarchy within the overlay network, gateway servers act as "funnels" to edge servers to increase the likelihood that a cacheable resource will be served from the CDN infrastructure and not from the origin infrastructure.

According to this disclosure, the SWR preferably is set to 0 at the gateway server 406 while, at the edge 404, an automatic policy is implemented (preferably) on a per-server basis where the SWR is computed on-the-fly as a function of the request rate. The first factor (setting SWR to 0 at the gateway 406) is advantageous because if/when the request reaches the gateway, the performance penalty has already happened (to some degree), and therefore it is desired to maximize the origin offload there (by setting SWR to 0 so as to not trigger the asynchronous process). On the other hand, and for maximum performance, it is desired to set SWR as high as possible at the edge 404, especially because the gateway servers (with the SWR=0 setting) are optimized to ensure optimum origin offload. Yet, applying a simplistic 100% value universally at the edge 404 would generate very high traffic between the edge servers and the gateways, and this would be detrimental to the CDN's ability to offer this system at scale and at a reasonable cost. By taking into account the hit rate at the edge server, however, a heuristic, which is described below, can be used to provide a best user experience at an optimal CDN infrastructure cost. The notion of "best" or "optimal" here, however, is not intended to refer to some absolute value or characteristic but may be relative in nature and/or degree.

The following describes a preferred heuristic. In particular, let R be the incoming request rate at the edge 404 at a given point in time (in hits/second), and SWR a percentage of the TTL (in seconds). (The edge machine is assumed to be receiving requests from a large number of clients, as typically the machine caches and serves content for a large number of content providers that use the CDN service). Assuming a uniform request temporal distribution, and to guarantee that a last hit before TTL is reached falls within SWR, a preferred heuristic for the edge is then as follows:

SWR(% of TTL)=100/(TTL*R).

For instance, if the TTL is 10 seconds, SWR would be set to 10% if the request rate is one per second, to 5% if the request rate is two per second, and so forth.

A constraint on the rule set forth in the above equation is that: 0<SWR<100. To ensure with good confidence that the response to the asynchronous call comes back before the TTL expires, preferably the system also sets SWR*TTL>Minimum (seconds), where the Minimum is defined either statically (e.g., one second), or as some multiplier of the observed latency to fetch the resource from the edge server. In light of the point above, for very short TTLs or other corner use cases (e.g. the server is being placed online and has no request history), the automated policy may be disabled and a static SWR value (e.g., fetched from a configuration file specific to the resource) may be used.

The approach thus leverages the typical CDN two-tier caching architecture, with SWR at the edge preferably set to 100/(TTL*R), and set to 0 at the gateway. The approach achieves an optimum performance and origin offload, while minimizing the CDN internal traffic. Once again, the notion of "optimum" should be not be taken as some absolute value but may be relative in nature and/or scope.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a stand-alone machine, or across a distributed set of machines. The functionality may be provided as a service, e.g., as a SaaS solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus. While given components of the system have been described separately, one of ordinary skill will appreciate that some of the functions may be combined or shared in given instructions, program sequences, code portions, and the like.

Preferably, the functionality is implemented in an application layer solution, although this is not a limitation, as portions of the identified functions may be built into an operating system or the like that executes in a given machine.

The functionality may be implemented with or in association with other application layer protocols besides HTTP or HTTPS, such as SSL VPN or TLS, or any other protocol having similar operating characteristics.

The term "gateway" is not intended to be limiting, as typically the forward server (the one closer to the origin infrastructure) is just another edge server in the CDN located in a different location/network.

Generalizing, it should be appreciated that the SWR window as described and illustrated herein is an asynchronous (async) refresh window. In the SWR implementation as described, the async refresh window starts before the TTL expires; another equally valid approach is to add the async refresh window after the TTL. Thus, the technique herein of optimizing the value of the async refresh window by making it dynamic (preferably to match the rate of incoming requests) applies equally well to both cases (i.e., whether the window is applied right before or right after the TTL expires).

The notion of setting the SWR to zero at the gateway does not require that the value be an absolute 0 but also includes a value that is "substantially zero."

Generalizing further, there is no limitation on the type of computing entity that may implement the client-side or server-side of the connection. Any computing entity (system, machine, device, program, process, utility, or the like) may act as the client or the server.

While the technique above has been described in the context of a tiered caching system, it should be appreciated that the approach also provides significant advantages in a single tier system (edge servers only). In this single tier caching context, the SWR is dynamically computed in the same way as described above, with the only difference being that the request from the edge server would go directly to the origin and not thru a parent (gateway) server.

There is no limitation on the type of content that is delivered by the CDN. Typical examples include, without limitation, website objects (e.g., HTML, page objects, etc.), API-driven content, media content or content fragments, or the like.

The techniques herein provide for improvements to another technology or technical field, namely, content delivery systems, as well as improvements to the functioning of edge servers within such systems.

What is claimed is as follows:

1. A system associated with an origin server at which content to be delivered to a set of client machines is published, comprising:
    an overlay network comprising first and second computing machines each having a hardware processor, and computer memory;
    an edge server process executing in the hardware processor of the first machine;
    a forward server process executing in the hardware processor of the second machine;
    each server process being configured to enforce a stale-while-revalidate (SWR) cache-control whereby the server process is enabled to immediately return a stale response in response to a request while attempting to revalidate the request in a background action;
    the edge server process having computer program instructions stored in the computer memory and executed in the hardware processor of the first machine to compute and enforce an SWR cache-control value set to a first SWR value, wherein the first value is a function of rate of requests from the set of client machines received at the edge server process; and
    the forward server process having computer program instructions stored in the computer memory and executed in the hardware processor of the second machine to enforce a SWR set to a second SWR value;
    wherein the first SWR value at the edge server process is SWR (% of TTL)=100/(TTL*R), wherein TTL refers to a time-to-live of the content and R is the rate of requests, and the second SWR value at the forward server process is 0;
    wherein enforcing the first and the second SWR values improves an operation of the overlay network by reducing internal traffic being the edge server process and the forward server process.

2. The system as described in claim 1 wherein the first SWR value satisfies a constraint that is: 0<first SWR value<100.

3. The system as described in claim 1 wherein the first SWR value also satisfies a constraint that is: (first SWR value)*TTL>a minimum number of seconds.

4. The system as described in claim 3 wherein the minimum number of seconds is one of: a fixed number of seconds, and a multiplier of an observed latency associated with fetching the content from the edge server process.

5. The system as described in claim 1 wherein the first SWR value and the second SWR value define an asynchronous SWR refresh window.

6. The system as described in claim 5 wherein the asynchronous SWR refresh window starts before or at a time when the TTL expires.

7. The system as described in claim 1 wherein the first SWR value is computed dynamically.

8. The system as described in claim 1 wherein the edge server process and the forward server process comprise a tiered caching hierarchy for the content.

9. An edge server, operative in an overlay network, the edge server being configured to enforce a stale-while-revalidate (SWR) cache-control whereby the edge server is enabled to immediately return a stale response in response to a request while attempting to revalidate the request in a background action, comprising:
    a hardware processor;
    computer memory holding computer program instructions executed by the hardware processor to compute and enforce an SWR cache-control value as a function of request rate;
    wherein the SWR cache-control value is computed as: SWR (% of TTL)=100/(TTL*R), wherein TTL refers to a time-to-live of the content and R is the request rate;
    wherein enforcing the SWR cache-control value improves an operation of the overlay network by reducing traffic between the edge server and an origin server.

10. The edge server as described in claim 9 wherein the computer program instructions are further executed by the hardware processor during an SWR period to issue a revalidation request to one of: a gateway server, and an origin server.

11. A method of self-adjusting a tiered caching system to optimize traffic performance and origin server off-load, the tiered caching system comprising an edge server and a forward server, each of the edge server and the forward server being configured to enforce a stale-while-revalidate (SWR) cache-control whereby the server is enabled to immediately return a stale response in response to a request while attempting to revalidate the request in a background action, comprising:
    enforcing a first SWR cache control value at the edge server; and
    concurrently enforcing a second SWR cache control value at the forward server;
    the first SWR value being computed as a function of request rate for content at the edge server, and the second SWR value being substantially zero;
    wherein the first SWR value is SWR (% of TTL)=100/(TTL*R), wherein TTL refers to a time-to-live of the content and R is the request rate;
    wherein enforcing the first and the second SWR cache control values improves an operation of the tiered caching system by reducing internal traffic being the edge server and the forward server.

12. The method as described in claim 11 wherein the first SWR value satisfies a constraint that is: 0<first SWR value<100.

13. The method as described in claim 11 wherein the first SWR value also satisfies a constraint that is: (first SWR value)*TTL>a minimum number of seconds.

14. The method as described in claim 13 wherein the minimum number of seconds is one of: a fixed number of seconds, and a multiplier of an observed latency associated with fetching content from the edge server process.

15. The method as described in claim 11 wherein the first SWR value and the second SWR value define an asynchronous SWR refresh window.

16. The method as described in claim 15 wherein the asynchronous SWR refresh window starts before or at a time when the TTL expires.

* * * * *